April 7, 1970 J. BUHR 3,505,604

SELECTIVE AUTOMATIC MOTOR SHUT-OFF NETWORKS FOR SIGNAL SEEKING RECEIVERS

Filed Dec. 19, 1966

INVENTOR.
JACOB BUHR

BY [signature]

PATENT AGENT

United States Patent Office 3,505,604

Patented Apr. 7, 1970

3,505,604

SELECTIVE AUTOMATIC MOTOR SHUT-OFF NETWORKS FOR SIGNAL SEEKING RECEIVERS

Jacob Buhr, Kitchener, Ontario, Canada, assignor to Electrohome Limited, Kitchener, Ontario, Canada Filed Dec. 19, 1966, Ser. No. 602,940
Int. Cl. H04b *1/32*
U.S. Cl. 325—470 9 Claims

ABSTRACT OF THE DISCLOSURE

A signal seeking receiver has an automatic shut-off network operable in a first mode to automatically turn off the tuner motor of the receiver upon tuning to the frequency of either of two different types of signals, e.g., F.M. monaural and F.M. stereo, and operable in a second mode to turn off the motor only when the receiver is tuned to the frequency of one of the foregoing types of signals.

Figures 1, 2:
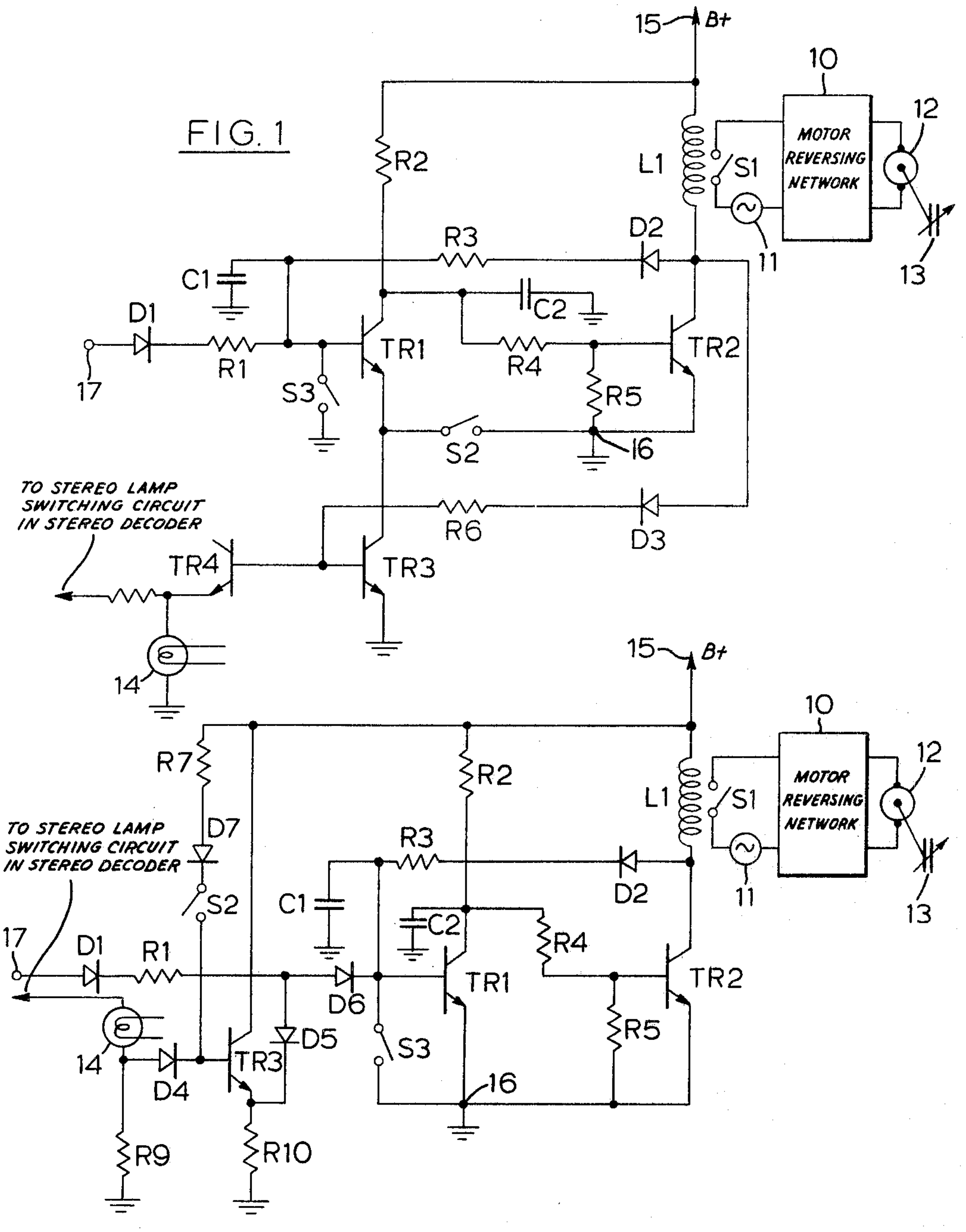

This invention relates to radio receivers of the signal seeking type. More particularly, this invention relates to networks for automatically turning off the motor of a signal seeking receiver when the receiver is tuned to the frequency of a signal being received by the receiver and of a strength greater than a minimum predetermined signal strength. Even more particularly, this invention relates to automatic shut-off networks for automatically turning off the motor of a signal seeking receiver when the receiver is tuned to the frequency of a certain type of signal, such as a stereophonic signal, $$(L+R)+(L-R)\cos\omega t+P\cos\frac{\omega t}{2}$$

L being the left channel audio signal, R being the right channel audio signal, P being the pilot carrier amplitude, $\omega=2\pi f$, $f$ presently being 38 kHz., the motor continuing to operate when the receiver is tuned to the frequency of a different type of signal, such as a monaural signal.

In any signal seeking receiver it is necessary to provide some means for turning on the motor that drives the tuning condenser of the receiver when the latter is turned on but no signal is being received, or when it is desired to change stations. These means must be capable of automatically shutting off the motor when the receiver is tuned to a signal of a level greater than a minimum predetermined level. Since F.M. radio stations now provide both monaural and stereophonic transmissions, and since persons having receivers equipped for reproduction of F.M. stereophonic signals may prefer to listen to programs broadcast in stereo, rather than to programs broadcast in monaural form, it would be desirable to provide automatic shut-off networks for automatically turning off the motor of the receiver when a signal is being received only in the event that the signal is an F.M. stereophonic signal of a level above a minimum predetermined level. In other words, it would be desirable to provide a selective automatic shut-off network which would enable the listener to tune in only to F.M. stations broadcasting stereophonic signals. In accordance with this invention, networks are provided for accomplishing the foregoing objectives.

A signal seeking receiver embodying this invention is of a type having variable tuning means for varying the tuning of the receiver, and a motor drivingly connected to the tuning means, whereby the tuning of the receiver can be changed by operation of the motor. In accordance with this invention, such a signal seeking receiver is provided with an automatic shut-off network operable in a first mode to automatically turn off the motor when the receiver is tuned to the frequency of either of two different types of signals when either of these types of signals is being received by the receiver and is of a strength greater than a minimum predetermined signal strength and operable in a second mode to automatically turn off the motor when the receiver is tuned to the frequency of one of the types of the signals when this one type signal is being received by the receiver and is of a strength greater than a minimum predetermined signal strength, but to permit the motor to continue to operate when the receiver is tuned to the frequency of the other of the two types of signals.

This invention will become more apparent from the following detailed description, taken in conjunction with the appended drawings, in which FIGURES 1 and 2 are circuit diagrams illustrating two different types of automatic shut-off networks embodying this invention.

Referring to FIGURES 1 and 2, there is shown a motor 12 whose drive shaft is connected to the tuning capacitor 13 of a signal seeking receiver. Power to operate motor 12 is provided from any suitable A.C. or D.C. source, an A.C. source being schematically indicated in the figures as an A.C. generator 11, via the contacts S1 (when closed) of a relay and a motor reversing network 10 which may be of a conventional type. In fact, motor reversing network 10 is not essential to the operation of this invention, since, when tuning capacitor 13 reaches the limit of its travel in one direction, it could be returned manually to the other limit of its travel. The coil of the relay having contacts S1 is designated L1 in FIGURES 1 and 2.

The automatic shut-off network employs three transistors designated TR1, TR2 and TR3. In the network of FIGURE 1 a fourth transistor TR4 is used. A terminal 15 is connected to the positive terminal of a suitable D.C. source (B+) such as a battery or other D.C. power supply. Terminal 15 is connected via coil L1 to the collector electrode of transistor TR2. The emitter electrode of this transistor is connected to a terminal 16 at a D.C. reference potential, in the present case, ground potential. Terminal 15 also is connected via coil L1, a diode D2 and a resistor R3 to the base electrode of transistor TR1, whereby bias may be applied to the base electrode of transistor TR1. A capacitor C1 is connected between the base electrode of transistor TR1 and ground to prevent transistors TR1 and TR2 from oscillating via the loop consisting of diode D2 and resistor R3. The collector electrode of transistor TR1 is connected via a resistor R4 to the base electrode of transistor TR2. A resistor R5 is connected in voltage divider relationship with resistor R4 between terminal 16 and the base electrode of transistor RT2. A capacitor C2 is connected between ground and the collector electrode of transistor TR1 for the purpose of ensuring that upon the application of B+ to terminal 15, transistor TR1, rather than transistor TR2, will turn on. Terminal 15 also is connected to the collector electrode of transistor TR1 via a resistor R2. A switch S3 is connected between the base electrode of transistor TR1 and ground. A signal input terminal 17 is connected to the base electrode of transistor TR1 via an isolating diode D1 and a resistor R1. The signal applied to signal input terminal 17 may be derived, for example, from any of the I.F. amplifiers of the receiver, further amplified, if necessary, and then detected to provide a positive D.C. signal, the latter being applied to terminal 17.

Referring now specifically to FIGURE 1, the emitter electrode of transistor TR1 is connected via a switch S2 to terminal 16. The emitter electrode of transistor TR1 also is connected to the collector electrode of transistor TR3, the emitter electrode of the latter being grounded.

It will be seen, therefore, that with switch S2 open, the collector current of transistor TR1 must flow through the collector-emitter path of transistor TR3. The collector electrode of transistor TR2 is connected to the base electrode of transistor TR3 via a diode D3 and a resistor R6. The base electrode of transistor TR4 is connected to the base electrode of transistor TR3. Transistor TR4 is of a type having a characteristic such that when its emitter-base junction is reverse biased, this junction will act as a Zener diode with a nominal rating of about 6.5 volts. The stereophonic indicator lamp 14 of the receiver is connected in the emitter circuit of transistor TR4 in such a manner that when the receiver is tuned to an F.M. stereophonic signal, there will be a sufficient voltage drop across lamp 14 to illuminate this lamp and to reverse bias the emitter-base junction of transistor TR4, assuming reception of a sufficiently strong signal, of course. The voltage drop across lamp 14 may be of the order of 9 volts, for example. As will become more apparent hereinafter, transistor TR4 is employed merely to ensure that after each momentary closing of switch S3, transistor TR3 will be turned on when the receiver is tuned to a stereophonic signal, but only under these circumstances, noise excepted. Any other arrangement to ensure the turn on of transistor TR3 under these circumstances can be used without departing form this invention.

Referring now specifically to the circuit of FIGURE 2, the emitter electrode of transistor TR1 is directly connected to terminal 16, A circuit consisting of a resistor R7, a diode D7 and switch S2 is connected between terminal 15 and the base electrode of transistor TR3. A diode D6 is connected between resistor R1 and the base electrode of transistor TR1, while a diode D5 having its anode connected to the anode of diode D6 is connected between the emitter electrode of transistor TR3 and the common terminal of resistor R1 and diode D6. A resistor R10 is connected between the emitter electrode of transistor TR3 and ground. One terminal of stereophonic indicator lamp 14 is connected via a resistor R9 to ground and also via a diode D4 to the base electrode of transistor TR3.

The operation of the networks shown in FIGURES 1 and 2 now will be discussed. When relay contacts S1 are closed, generator 11 is connected to motor 12 via closed contacts S1 and motor reversing network 10, and motor 12 will drive tuning capacitor 13 to change the tuning of the receiver. Motor reversing network 10 can include microswitches that are operated when the tuning capacitor reaches the limits of its travel in both directions, operation of the microswitches causing motor 12 to reverse direction.

Transistors TR1 and TR2 are so connected that when one is turned on, the other is kept turned off, and vice versa until the state of conduction of the former transistor changes, i.e., in bistable configuration.

The collector and emitter electrodes of transistor TR2 are connected in a circuit through which current required in order for motor 12 to operate must flow. In this respect, motor 12 only can operate provided that transistor TR2 is turned on. Only under these conditions can sufficient current pass from terminal 15 through coil L1 and the collector and emitter electrodes of transistor TR2 to ground to close relay contacts S1. Of course, rather than employing a relay, transistor TR2 could be connected in a circuit through which either the armature or the field current of motor 12 must pass.

Referring to both figures, with switch S3 open, a positive D.C. potential, B+, which may be 10 to 12 volts, for example, is applied to terminal 15, and, regardless of whether switch S2 is opened or closed, transistor TR1 will be biased on, even if there is no input signal present at signal input terminal 17. With transistor TR1 turned on, transistor TR2 will be kept off, and, since transistor TR2 must be turned on before motor 12 can start, motor 12 will not operate.

The path for the current required to turn on transistor TR1 of FIGURE 1 with switch S2 closed and switch S3 open includes coil L1, diode D2. resistor R3, the base-emitter junction of transistor TR1 and switch S2. With reference again to FIGURE 1, with switches S2 and S3 open and B+ applied to terminal 15, transistor TR3 will turn on, the turn on current flowing from terminal 15 to ground via coil L1, diode D3, resistor R6 and the base-emitter junction of transistor TR3. Transistor TR1 then will turn on, the turn on current flowing from terminal 15 to ground via coil L1, diode D2, resistor R3, the base-emitter junction of transistor TR1 and transistor TR3. With reference now to FIGURE 2, with switch S3 open and B+ applied to terminal 15, TR1 will turn on regardless of the position of switch S2. The turn on current will flow from terminal 15 to ground via coil L1, diode D2, resistor R3 and the base-emitter junction of transistor TR1. If switch S2 is open, the application of B+ to terminal 15 will not cause transistor TR3 to turn on, but, if switch S2 is closed, transistor TR3 will turn on when B+ is applied to terminal 15, the turn on current flowing from terminal 15 to ground via resistor R7, diode D7, switch S2, the base-emitter junction of transistor TR3 and resistor R10.

Diode D2 provides a low impedance path in the networks of both FIGURES 1 and 2 for the turn on current which assists in ensuring that transistor TR1 will be turned on before transistor TR2 when B+ is applied to terminal 15. It will be appreciated that if transistor TR1 were not turned on before transistor TR2, the latter transistor would be turned on due to current flowing from terminal 15 to terminal 16 via resistors R2, R4 and R5. This would result in transistor TR1 losing its control function. Diode D2 also presents a high impedance to any positive signal appearing at the base electrode of transistor TR1, by virtue of which excessive loading of this signal is eliminated.

Referring now specifically to FIGURE 1, with switch S2 closed, the circuit of FIGURE 1 will operate in such a manner that motor 12 will stop when the receiver is tuned to the frequency of a signal being received by the receiver and of a strength greater than a minimum predetermined signal strength regardless of whether the signal is a monaural signal or a stereophonic signal. With switch S2 closed, switch S3 open, and B+ applied to terminal 15, transistor TR1 will be turned on and will keep transistor TR2 turned off. Under these circumstances, the small current which will flow through coil L1 will be unable to close contacts S1, so motor 12 will not be operating. In order to start motor 12, it is necessary to close momentarily switch S3, which will ground the base electrode of transistor TR1, reducing the bias applied thereto to below that which is required to keep transistor TR1 on. When this is done, the relatively high voltage which, prior to the momentary closing of switch S3, had been applied to the base electrode of transistor TR1 via coil L1, diode D2 and resistor R3 and which kept this transistor turned on, immediately will decrease to ground potential causing transistor TR1 to turn off. When transistor TR1 turns off, the voltage at its collector electrode will rise, and this relatively high voltage will be applied to the base electrode of transistor TR2 via the voltage divider network consisting of resistors R4 and R5, and, whereas when transistor TR1 was turned on and its collector voltage was relatively low, thereby holding transistor TR2 off, now transistor TR2 will turn on because of the increase in the voltage which will be applied to its base electrode when transistor TR1 is turned off. The voltage at the collector electrode of transistor TR2 will drop as soon as this transistor turns on, and this relatively low voltage will be applied to the base electrode of transistor TR1 via diode D2 and resistor R3, thereby keeping transistor TR1 turned off. The voltage at the collector electrode of transistor TR2 when it is turned on is dependent on the saturation voltage of the transistor and typically may be of the order of +0.2 to +0.3 volt. Once transistor TR2 is turned on, a current sufficient to close contacts S1 will flow from terminal 15 to terminal 16 via coil L1 and the collector and emitter electrodes of transistor TR2, and motor 12 will begin to operate.

Motor 12 will continue to run until the receiver is tuned to either a monaural or a stereophonic signal of a strength greater than a minimum predetermined strength. When the receiver is tuned to such a signal, an input signal will be applied to input terminal 17. This signal will appear as a positive D.C. voltage at the base electrode of transistor TR1. Provided that the signal at the base electrode of transistor TR1 is above a minimum level, transistor TR1 will turn on. Transistor TR2 then will be turned off, by virtue of which the current flowing through coil L1 will be decreased to a value insufficient to hold contacts S1 closed, as a result of which motor 12 will stop. Transistor TR1 will keep transistor TR2 turned off until switch S3 is closed again.

In order to tune to another station, it is only necessary to momentarily close switch S3 again, whereupon the sequence of events outlined hereinbefore will be repeated.

If it is desired to listen only to stations broadcasting stereophonic signals, switch S2 should be opened. When this is done, it is impossible for a monaural signal to turn off transistor TR2, because the collector current of transistor TR1 can not flow until transistor TR3 is turned on, and, after each momentary closing of switch S3 to initiate motor operation, only stereophonic signals (noise excepted) can cause transistor TR3 to turn on, as will become more apparent hereinafter. Thus, if at the time when a signal (indicative of reception of a monaural or a stereophonic signal) which would ordinarily turn on transistor TR1 is applied to input terminal 17, transistor TR3 is not turned on, transistor TR1 will remain turned off, and transistor TR2 will remain turned on, so that motor 12 will continue to operate. However, when the receiver is tuned to a stereophonic signal of a strength greater than a minimum predetermined signal strength, there will be present a 19 kHz. signal which, through known circuitry, will produce a voltage drop across stereo indicator lamp 14. This voltage may be of the order of 9 volts, for example, and is applied across the emitter-base junctions of transistors TR3 and TR4. When this voltage is so developed, it will turn on transistor TR3. At the same time a signal will have been applied to input terminal 17 to turn on transistor TR1. With transistor TR3 turned on, transistor TR1 then will turn on causing transistor TR2 to turn off and motor 12 to stop. Thus, only stations broadcasting stereophonic signals will be tuned in. When transistor TR2 is turned off, its relatively high collector voltage keeps transistor TR3 turned on. Again, in order to initiate operation of motor 12 and select another station broadcasting a stereophonic signal, it only is necessary to momentarily close switch S3. After switch S3 has been closed momentarily, resulting in the turn off of transistor TR1 and the turn on of transistor TR2, the relatively low collector voltage of transistor TR2 will cause transistor TR3 to turn off, and transistor TR3 will remain turned off until the receiver is tuned to a stereophonic signal.

While signal seeking is taking place, noise sometimes will cause a rise in the voltage across indicator lamp 14, but the Zener effect of transistor TR4 will prevent the triggering on of transistor TR3 under these circumstances, provided that the voltage developed across lamp 14 as a result of the noise is less than the Zener breakdown voltage of the base-emitter junction of transistor TR4.

Referring now to the circuit shown in FIGURE 2, when switch S2 is closed, motor 12 will stop when either monaural or stereophonic signals are being received, and the operation of the trigger circuit consisting of transistors TR1 and TR2 and the components interconnecting the same will be essentially the same as has been discussed hereinbefore in connection with FIGURE 1. With switch S2 closed, both transistors TR1 and TR3 will be turned on when B+ is applied to terminal 15. When transistor TR3 is turned on, a voltage is developed across resistor R10 that back biases diode D5, thereby preventing any shunting effect on the base electrode of transistor TR1. The addition of diode D6 does not affect the operation of the trigger circuit as hereinbefore described when switch S2 is closed. With switch S2 closed, transistor TR3 will remain turned on regardless of the state of conduction of transistors TR1 and TR2.

For stereo only signal seeking to occur, it is necessary for switch S2 to be open. In the absence of a stereophonic signal at a level greater than a predetermined minimum level, transistor TR3 will not normally conduct, and any signal indicative of reception of a monaural signal and applied to the base electrode of transistor TR1 via diode DI and resistor R1 will be shunted to ground via diode D5 and resistor R10, so that transistor TR1 will not turn on if resistors R1 and R10 are properly chosen. The voltage at the junction of diodes D5 and D6 will have to be of the order of +0.8 volt in order to turn on transistor TR1. Since the drop across diode D5 will be of the order of +0.6 volt, the drop across resistor R10 must exceed about +0.2 volt before transistor TR1 will turn on. By choosing resistors R1 and R10 relative to the maximum voltage which will appear at input terminal 17, transistor TR1 can be prevented from turning on for any monaural signal.

When the receiver is tuned to a stereophonic signal, a voltage will be developed across resistor R9. This voltage will be applied via diode D4 to the base electrode of transistor TR3. The voltage applied to the base electrode of transistor TR3 via diode D4 will turn on transistor TR3, assuming reception of a sufficiently strong signal, and a voltage then will be developed across resistor R10 which will be approximately 0.6 volt (base-emitter drop of transistor TR3) below the base voltage of transistor TR3. The voltage developed across resistor R10 under these circumstances will back bias diode D5, so that transistor TR1 then can be turned on by the signal applied to input terminal 17. When transistor TR1 is turned on, transistor TR2 will be turned off and motor 12 will stop. The relatiely high voltage appearing at the collector electrode of transistor TR2 when it is turned off will keep transistor TR1 turned on via diode D2 and resistor R3.

In order to select another station broadcasting a stereophonic program, it is only necessary to momentarily close switch S3. This will cause transistor TR1 to turn off, which, in turn will cause transistor TR2 to turn on and motor 12 to operate. Transistor TR3 will turn off when the tuner is pulled off station, and it will not normally turn on again until the receiver is tuned to another stereophonic signal.

It should be noted that diode D4 also serves to prevent current flowing through resistor R7 and diode D7 from passing through indicator lamp 14 when switch C2 is closed.

In the circuit of FIGURE 1, when indicator lamp 14 is first switched on, there will be a delay in the voltage rise across this lamp because of the time required to heat up the lamp and stabilize its operating resistance. In the circuit of FIGURE 2, however, the relatively low resistance of lamp 14 when it is first switched on allows a relatively higher volt age to appear across resistor R9 than appears across this resistor after operation of the lamp has been stabilized, and this allows diode D5 to be back biased quickly, thereby permitting transistor TR1 to turn on quickly.

It should be appreciated that by adding other diodes at the junction of diode D1 and resistor R1, other control voltages may be used, e.g., control voltages indicative of tuning to an A.M. station. Since these additional diodes will be reverse bias connected with respect to diode DI1 and each other, no appreciable loading will take place.

In both the circuits of FIGURES 1 and 2 capacitor C2 ensures that the voltage applied to the base electrode of transistor TR2 when B+ is applied initially to terminal 15 will be kept relatively low. This aids in ensuring that transistor TR1 will be turned on before transistor TR2 when B+ is applied initially to terminal 15.

As aforementioned, the function of capacitor C1 is to prevent oscillation of the trigger circuit consisting of transistors TR1 and TR2 and the components which interconnect the same.

While preferred embodiments of this invention have been disclosed herein, those skilled in the art will appreciate that changes and modifications may be made therein without departing from the spirit and scope of this invention as defined in the appended claims.

What I claim as my invention is:

1. In a signal seeking receiver of a type having variable tuning means for varying the tuning of said receiver and a motor drivingly connected to said tuning means, whereby the tuning of said receiver can be changed by operation of said motor; an automatic shut-off network operable in a first mode to automatically turn off said motor when said receiver is tuned to the frequency of either of two different types of signals being received by said receiver and of a strength greater than a minimum predetermined signal strength, and operable in a second mode to automatically turn off said motor when said receiver is tuned to the frequency of one of said types of said signals when said one type signal is being received by said receiver and is of a strength greater than a minimum predetermined signal strength but to permit said motor to continue to operate when said receiver is tuned to the frequency of the other of said types of said signals, said automatic shut-off network comprising first and second transistors interconnected in bistable configuration such that when either of said transistors is turned on or off, the other of said transistors is kept turned off or on respectively by the first-mentioned transistor until the state of conduction of said first-mentioned transistor changes, means connecting said second transistor in a circuit through which current required in order for said motor to operate must pass, whereby when said second transistor is turned off, said current is unable to flow through said circuit and said motor ceases operating, means for supplying a biasing voltage to said first transistor to turn on said first transistor when said motor is not operating, means for changing the state of conduction of one of said transistors to turns on the second transistor and initiate operation of said motor and first switching means having first and second different states, said signal seeking receiver also including means for supplying a first signal to said first transistor when said receiver is tuned to the frequency of a signal being received by said receiver to turn on said first transistor when said signal is of a strength greater than a minimum predetermined signal strength and said first switching means is in said first state thereof, and means responsive to said first switching means being in said second state thereof preventing said first signal from turning on said first transistor unless said first signal is of said one type.

2. The invention according to claim 1 wherein said means for changing the state of conduction of one of said transistors includes second switching means having first and second different states and which initiate operation of said motor when in said second state thereof and means responsive to said second switching means being in said second state thereof providing a path for reducing said biasing voltage supplied to said first transistor below that required to keep said first transistor turned on, whereby said first transistor is turned off when said second switching means is in said second state thereof.

3. The invention according to claim 1 wherein said one type signal is a stereophonic signal and said other type signal is a monaural signal.

4. The invention according to claim 1 wherein the last-mentioned means include a third transistor, means connecting said third transistor in a circuit through which the output current of said first transistor must pass when said first switching means is in said second state thereof, and means for supplying a signal indicative of said receiver being tuned to said one type signal to said third transistor to turn on said third transistor.

5. The invention according to claim 4 including means interconnecting said second and third transistors for keeping said third transistor turned on after said third transistor has been turned on by said signal indicative of said receiver being tuned to said one type signal and while said second transistor is turned off.

6. The invention according to claim 5 wherein said transistors each have base, collector and emitter electrodes and including a first resistor connected between said collector electrode of said first transistor and said base electrode of said second transistor, a second resistor connected in voltage divider relationship with said first resistor and connected between said base electrode of said second transistor and a terminal at a reference potential, means connecting said emitter electrode of said second transistor and said terminal, means including said first switching means connected between said emitter electrode of said first transistor and said terminal, a first diode and a third resistor connected in series circuit with each other between said collector electrode of said second transistor and said base electrode of said first transistor; said means for supplying a biasing voltage to said first transistor comprising a D.C. power supply, said first diode and said third resistor, said D.C. power supply also being connected to said collector electrode of said second transistor and to said collector electrode of said first transistor; said means interconnecting said second and third transistors comprising a second diode and a fourth resistor connected in series circuit with each other between said collector electrode of said second transistor and said base electrode of said third transistor; said means connecting said third transistor in said circuit through which said output current of said first transistor must pass comprising means connecting said emitter electrode of said first transistor and said collector electrode of said third transistor, and means connecting said emitter electrode of said third transistor and said terminal.

7. The invention according to claim 1 wherein said transistors each have base, collector and emiter electrodes and wherein the last-mentioned means comprise a first circuit including a first diode providing a path for said first signal by-passing said base electrode of said first transistor when said first switching means is in said second state thereof and said first signal is of said other type, and means for reverse biasing said first diode to block said path when said receiver is tuned to the frequency of a signal of said one type.

8. The invention according to claim 7 wherein said means for reverse biasing said first diode include a third transistor having emitter, collector and base electrodes, and means for supplying a signal indicative of said receiver being tuned to said one type signal to said base electrode of said third transistor to turn on said third transistor, said first circuit including a first resistor, said first resistor also being connected in circuit with said emitter electrode of said third transistor.

9. The invention according to claim 8 including a second resistor connected between said collector electrode of said first transistor and said base electrode of said second transistor, a third resistor connected in voltage divider relationship with said second resistor and connected between said base electrode of said second transistor and a terminal at a reference potential, means connecting said emitter electrode of said second transistor and said terminal, means connecting said emitter electrode of said first transistor and said terminal, a second diode and a fourth resistor connected in series circuit with each other between said collector electrode of said second transistor and said base electrode of said first transistor; said means for supplying a biasing voltage to said first transistor comprising a D.C. power supply, said second diode and said fourth resistor, said D.C. power supply also being connected to said collector electrodes of said first, second and third transistors; said first resistor being connected between said emitter electrode of said third transistor and said terminal; said first switching means being connected in a circuit between said D.C. power supply and said base electrode of said third transistor.

References Cited

UNITED STATES PATENTS 3,334,187 8/1967 Pampel ---------- 325—471 XR

OTHER REFERENCES

Ryder: Electronic Fundamentals and Applications (third edition), 1964, p. 550, Figure 16–34.

KATHLEEN H. CLAFFY, Primary Examiner

B. P. SMITH, Assistant Examiner